US011027607B2

(12) United States Patent
Boete et al.

(10) Patent No.: US 11,027,607 B2
(45) Date of Patent: Jun. 8, 2021

(54) DRIVE SYSTEM FOR AN ENGINE ARRANGEMENT

(71) Applicant: VOLVO TRUCK CORPORATION, Gothenburg (SE)

(72) Inventors: Yann Boete, Lyons (FR); Julien Ameil, Lyons (FR)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 16/768,225

(22) PCT Filed: Dec. 29, 2017

(86) PCT No.: PCT/EP2017/084809
§ 371 (c)(1),
(2) Date: May 29, 2020

(87) PCT Pub. No.: WO2019/129357
PCT Pub. Date: Jul. 4, 2019

(65) Prior Publication Data
US 2020/0331344 A1    Oct. 22, 2020

(51) Int. Cl.
*B60K 25/02* (2006.01)
*F16H 1/28* (2006.01)
(Continued)

(52) U.S. Cl.
CPC ............. *B60K 25/02* (2013.01); *F16H 1/28* (2013.01); *F16H 7/02* (2013.01); *F16H 37/02* (2013.01);
(Continued)

(58) Field of Classification Search
CPC .............. B60K 25/02; B60K 2025/022; B60K 2025/024; F16H 1/28; F16H 2001/2872;
(Continued)

(56) References Cited

U.S. PATENT DOCUMENTS

| 4,862,770 A * | 9/1989 | Smith | F02B 67/04 |
| | | | 475/324 |
| 2003/0004029 A1* | 1/2003 | Lagarde | F16H 1/46 |
| | | | 475/331 |

(Continued)

FOREIGN PATENT DOCUMENTS

| DE | 102014200720 B3 | 2/2015 |
| EP | 0301704 A1 | 2/1989 |

(Continued)

OTHER PUBLICATIONS

International Search Report and Written Opinion dated Sep. 25, 2018 in corresponding International PCT Application No. PCT/EP2017/084809, 10 pages.

*Primary Examiner* — David R Morris
*Assistant Examiner* — Lori Wu
(74) *Attorney, Agent, or Firm* — Venable LLP; Jeffri A. Kaminski (57) ABSTRACT

A drive system for an engine arrangement, the drive system comprising an epicyclical gear reduction mechanism having a main axis and comprising: a first main gear, a second main gear arranged to rotate about main axis in the same direction as the first main gear, a first set of planet gears with planet gears meshing with the first main gear, a second set of planet gears with planet gears meshing with the second main gear, a planet carrier, supporting planet gears of the first and second planet gears, the planet carrier being located, along the main axis, between the first main gear and the second main gear.

19 Claims, 4 Drawing Sheets

(51) Int. Cl.
    *F16H 7/02*     (2006.01)
    *F16H 37/02*     (2006.01)
    *F16H 55/36*     (2006.01)
    *F02B 63/04*     (2006.01)
    *F02N 11/04*     (2006.01)

(52) U.S. Cl.
    CPC ........ *F16H 55/36* (2013.01); *B60K 2025/022* (2013.01); *F02B 63/042* (2013.01); *F02N 11/04* (2013.01); *F16H 2001/2872* (2013.01); *F16H 2055/366* (2013.01)

(58) Field of Classification Search
    CPC ...... F16H 55/36; F16H 2055/366; F16H 7/02; F16H 37/02; F02B 63/042; F02N 11/04
    See application file for complete search history.

(56) References Cited

U.S. PATENT DOCUMENTS

| | | | |
|---|---|---|---|
| 2008/0051242 A1* | 2/2008 | Usoro | .................... B60K 25/02 |
| | | | 475/5 |
| 2011/0053729 A1* | 3/2011 | Parsons | .................... F16H 3/54 |
| | | | 475/297 |
| 2011/0065543 A1 | 3/2011 | Usoro | |

FOREIGN PATENT DOCUMENTS

| | | |
|---|---|---|
| KR | 101693309 B1 | 1/2017 |
| WO | 2009121188 A1 | 10/2009 |
| WO | 2017017492 A1 | 2/2017 |

\* cited by examiner

DRIVE SYSTEM FOR AN ENGINE ARRANGEMENT

CROSS-REFERENCE TO RELATED APPLICATIONS

This application is a U.S. National Phase of PCT/EP2017/084809, filed Dec. 29, 2017, and published on Jul. 4, 2019, as WO 2019/129357 A1, all of which is hereby incorporated by reference in its entirety.

TECHNICAL FIELD

The invention relates to a drive system for an engine arrangement, an engine arrangement including such a drive system, a vehicle comprising such an engine arrangement, and a method for operating such an engine arrangement.

The invention can be applied in medium and heavy-duty vehicles, such as trucks, buses and construction equipment.

BACKGROUND

In order to decrease fuel consumption, engine arrangements have been developed that automatically stop an engine when the engine power is not needed—for example at a traffic light or in a traffic jam, when the driver depresses the brake pedal—and restarts the engine in response to a signal—typically when the driver actuates the accelerator pedal.

Such an engine arrangement comprises the engine, an electric machine, one or several accessories, and an accessory pulley to which the electric machine and the accessory (ies) are drivingly connected. A drive system comprising a gear reduction mechanism is used to join the accessory pulley and an engine crankshaft.

The application WO 2017/017492 discloses a drive system (1) for an engine arrangement (2). The drive system (1) is an epicyclic gearing (20) including:
- a first junction element (25) connected to an engine crankshaft (5);
- a second junction element (21) connected to an accessory pulley (9) which is drivingly connected to an electric machine (6) and at least one accessory (7);
- a third junction element (22) connectable to a free wheel (30);
- a free wheel which is connected to a non-rotating part (16) of the engine arrangement and which is arranged between the accessory pulley (9) and the engine block (4).

The engine arrangement can be in one of:
- a starting phase, in which the electric machine, powered by a battery, starts the engine;
- a running phase (i.e. normal driving conditions), in which the engine is running, drives the accessory, and drives the electric machine so that said electric machine can charge the battery; and
- an electric phase, in which the engine is stopped and the electric machine drives the accessory.

The drive system according to WO 2017/017492 allows the engine arrangement to be operated in any of these three phases, and allows smooth transitions between these three phases.

However, the location of free wheel (30) between the accessory pulley (9) and the engine block (4) render quite difficult to disassemble the free wheel, for instance, for maintenance issues. Furthermore, the arrangement disclosed in WO 2017/017492, wherein the freewheel is connected to a non-rotating part (16) of the engine arrangement such as, for instance, a carter (16) connected to the engine block (4), makes more difficult to design, package or mount an annular damper between the drive system and the engine block.

SUMMARY

An object of the invention is to provide an improved drive system for an engine arrangement which can overcome the drawbacks of the prior art drive systems.

To that end, and according to a first aspect, the invention relates to a drive system for an engine arrangement that comprises an epicyclical gear reduction mechanism having a main axis and comprising:
- a first main gear arranged to rotate about main axis,
- a second main gear arranged to rotate about main axis in the same direction as the first main gear,
- a first set of planet gears with planet gears meshing with the first main gear,
- a second set of planet gears with planet gears meshing with the second main gear,
- a planet carrier, supporting planet gears of the first and second planet gears, and located, along the main axis, between the first main gear and the second main gear.

Each planet gear of the first set planet gears is coupled to a planet gear of the second set of planet gears in such a manner that no relative rotation is possible between them. Moreover, in the mounted position, the first main gear is connected to an engine crankshaft, and the planet carrier is connected to at least one accessory pulley which is drivingly connected to an electric machine and preferably to at least one accessory.

The drive system according to the invention further comprises a free wheel which is connected to a non-rotating part of the engine arrangement in the mounted position.

The second main gear is configured to be coupled, preferably via an intermediate junction element of the drive system, to the free wheel in a first operating phase of the drive system. In the first operating phase, the free wheel is configured such that when the second main gear exerts torque on the free wheel in one direction, the free wheel is in an engaged state and stops the rotation of the second main gear, and when the second main gear exerts torque on the free wheel in the opposite direction, the free wheel is in a free state and allows rotation of the second main gear.

According to the invention the planet carrier is advantageously located, along the main axis, between the first main gear and the free wheel.

According to embodiments of the invention, it is possible to have, in the mounting position, the accessory pulley is located between the engine block and the free wheel. In other words, the free wheel can be arranged on the driving system at a location that is opposite to the engine block with respect to the accessory pulley. As such, the mounting process of the drive system, the assembling process of the drive system in the engine arrangement and the maintenance of the driving system are made easier.

Furthermore, it is possible to have in the engine arrangement an annular damper that is located along the axis of rotation of the engine crankshaft between the accessory pulley and the engine. The annular damper is preferably attached between the engine crankshaft and the first main gear. More preferably the annular dumper is attached to the first main gear. Such a location is convenient because it allows damping damaging vibrations caused by the engine in some engines situations and to protect both the crankshaft and the drive system from these vibrations.

Furthermore, the epicyclical gear reduction mechanism according to the invention is designed such that when the first main gear is receiving torque from the planet carrier in the first operating phase, the second main gear exerts torque on the free wheel in one direction, the free wheel then being in an engaged state, and such that when the first main gear is generating a positive torque, the second main gear exerts torque (directly or via an intermediate junction element) on the free wheel in the opposite direction, the free wheel then being in a free state.

Besides, in the mounted position, the free wheel may be attached to a non-rotating part of the engine arrangement, such as an extension arm or a bracket. This bracket can be fixedly connected to the engine block and can extend beside the accessory pulley. The free wheel fixation can advantageously be soft enough (by means of an elastomeric connection) to be able to adapt to some mechanical tolerances, while still being able to block the free wheel in rotation.

The mounted position means the position in which the drive system is installed within the engine arrangement and can be operated.

The "free state" of the free wheel corresponds to the configuration in which the free wheel disengages a drive member, that is connected to the free wheel or that is part of the free wheel, from a driven member, that is connected to the free wheel or that is part of the free wheel, while in the "engaged state" of the free wheel the drive member is engaged with the driven member by means of the free wheel, acting as a transmitting device. The drive member can be a driveshaft connected to the free wheel or a driveshaft of the free wheel and the driven member can be a driven shaft connected to the free wheel or a driven shaft of the free wheel.

In practice, the first operating phase corresponds to a starting phase of the engine, in which the electric machine rotates the engine up to start speed. In this starting phase, the free wheel provides a single way connection from the electric machine to the engine. Indeed:

At the beginning of the starting phase, the rotational speed of the engine is fairly low. Combustion is not established and engine needs torque to rotate. The free wheel, which receives through the second main gear a first torque oriented in one direction, is in an engaged state. This configuration allows transmission of torque from the electric machine to the engine;

When combustion is established, the engine accelerates sharply and the crankshaft provides torque. The free wheel, which receives through the second main gear a second torque oriented in an opposite direction, is in a free state and allows a free acceleration of the crankshaft. No torque, or only an insignificant torque, is transmitted from the engine to the electric machine or to the accessory. The electric machine speed is considered as being uncorrelated to crankshaft speed.

At the beginning of the starting phase, the reduction ratio between the rotational speeds of the engine and the electric machine is $Ra=R0 \times R1a$, wherein:

R0 is the reduction ratio between the electric machine and the accessory pulley. R0 can be about 4 for example;

R1a is the reduction ratio between the accessory pulley and the crankshaft. Thanks to the invention R1a can be superior to 2 and can be about 4 for example.

As a result, Ra can be about 16 (i.e. 120 rpm at the crankshaft corresponding to 1920 rpm at the electric machine).

The reduction ratios Ro and R1a can be adjusted depending on the vehicle architectures. For instance, the gear dimensions of the epicyclical gear reduction mechanism can be modified to adjust the reduction ratio R1a. To this aim, the planet gears of the first set of planet gears have advantageously a pitch circle diameter that is different from the pitch circle diameter of the planet gears of the second set of planet gears, and the second main gear has a pitch circle diameter that is different from the pitch circle diameter of the first main gear. Expressed differently, if we assume that teeth have the same dimensions, each planet gear of the first set of planet gear has a number of teeth that is different from the number of teeth of each planet gear of the second set of planet gears, and the second main gear has a number of teeth that is different from the number of teeth of the first main gear.

A "pitch circle diameter" is also well known as a "pitch diameter" and corresponds approximately to the diameter of the circle passing through the half height of the teeth of a gear.

The drive system according to the invention allows, in a mounting position, having an accessory pulley connected to the planet carrier in the mounting position and therefore having the accessory pulley located between the engine block and the free wheel. In other words, the free wheel can be located, in a mounting position, on the driving system at a location that is opposite to the engine block with respect to the accessory pulley. As previously explained, this location is suitable to make easier the assembling process of the drive system and to make easier the accessibility of the free wheel. This location is also advantageous insofar as having the accessory pulley connected to the planet carrier while the crankshaft is connected to the first main gear allows, during the first operating phase, having a reduction ratio R1a between the accessory pulley and the crankshaft that is superior to 2 and that can be about 4. Having this minimum reduction ratio is of importance to allow the electric machine to transmit sufficient torque to engine crankshaft to start the engine.

Due to the free wheel, torque transmission from the engine to the electric machine at the end of the starting phase is prevented, and therefore prevents the engine from damaging the accessory pulley and/or pieces connected to it, such as a belt or the electric machine.

A significant advantage of the invention is that the use of a free wheel allows an automatic and immediate disconnection of the engine and the electric machine as soon as the combustion engine torque becomes positive. As a result, response time problems are avoided.

Subsequently, the drive system can be brought in another operating phase, typically in a running phase, in which the reduction ratio between the rotational speeds of the engine and the electric machine is different from Ra. In this operating phase, said ratio is $Rb=R0 \times R1b$. R1b is the reduction ratio between the accessory pulley and the crankshaft in the second operating phase which, thanks to the drive system of the invention, can be equal to 1.

The second main gear can further be configured to be coupled to the accessory pulley, in a second operating phase. The second operating phase can correspond to a running phase, in which the engine is running and drives the electric machine and the accessory.

In the second operating phase, the drive system is preferably configured such that the engine may receive power from the electric machine. In this case, the electric machine may use electric energy stored in the battery to boost the engine for performance or fuel consumption purpose.

To this aim, the second main gear, or preferably the intermediate junction element, may be moveable between a first position, in the first operating phase, in which the second main gear is coupled to the free wheel, and a second position, in a second operating phase, in which the second main gear is coupled to the accessory pulley in the mounted position. Preferably, in the second position, the second main gear is coupled to the planet carrier, preferably via said intermediate junction element.

It is therefore possible to provide at least two advantages:
having the pulley accessory located between the engine block and the free wheel, and
having reduction ratios R1a and R1 b between the accessory pulley and the crankshaft that are different in the first operating phase and in the second operating phase, with a ratio of difference R1a/R1 b that is greater than 2 and preferably about 4.

In an embodiment, the second main gear, or preferably the intermediate junction element, is moveable in translation along said main axis.

According to an embodiment, the second main gear, or preferably the intermediate junction element, comprises first coupling members for coupling with the free wheel, and second coupling members for coupling with the accessory pulley, preferably for coupling with the planet carrier. For example, the first and/or second coupling members can comprise dog teeth.

The second main gear, or preferably the junction element, is further configured to take a third position where it is uncoupled from the free wheel and from the accessory pulley, in a third operating phase. Preferably, the second main gear, or preferably the junction element, is configured to take a third position where it is uncoupled from the free wheel and from the planet carrier, in the third operating phase.

When the second main gear, or preferably the junction element, is uncoupled from the free wheel and from the accessory pulley, it is in a third position that can be axially intermediate between the first and second positions.

The intermediate junction element is advantageously a slider able to slide in translation along said main axis. The slider may be coupled to the second main gear via a sliding connection without possibility of relative rotation between the slider and the second main gear.

Preferably, the first main gear is a first annular gear having its gear teeth oriented radially inwards and the second main gear is a second annular gear having its gear teeth oriented radially inwards.

Alternatively, the first main gear is a first sun gear having its gear teeth oriented radially outwards and the second main gear is a second sun gear having its gear teeth oriented radially outwards.

According to a second aspect, the invention relates to an engine arrangement comprising an engine, an electric machine, at least one accessory, and an accessory pulley to which the electric machine and the accessory are drivingly connected, and further comprising a drive system as previously described.

In practice, the at least one accessory can be one of: a water pump, an air conditioner compressor, a cooling fan.

The engine arrangement may further comprise at least one sensor for detecting the operating condition of the engine, a controller connected to said sensor and capable of controlling an actuator configured to allow coupling or uncoupling the third junction element of the gear reduction mechanism and the free wheel.

The actuator can be configured to move the second main gear, or preferably the intermediate junction element, of the gear reduction mechanism to place it in one of its first, second and third positions, depending on the detected engine operating condition. The operating condition of the engine can correspond to a current operating phase of the engine or to a desired operating phase of the engine, i.e. when the driver requires the engine to be started, stopped, or restarted.

Advantageously, the accessory pulley is located, along the axis of rotation of the engine crankshaft, between the engine and the free wheel.

The engine arrangement may further comprise an annular damper that is located, along the axis of rotation of the engine crankshaft, between the accessory pulley and the engine. The annular damper may be attached between the engine crankshaft and the first main gear. Preferably, the annular dumper is attached to the first main gear.

According to a third aspect, the invention relates to a vehicle comprising an engine arrangement as previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
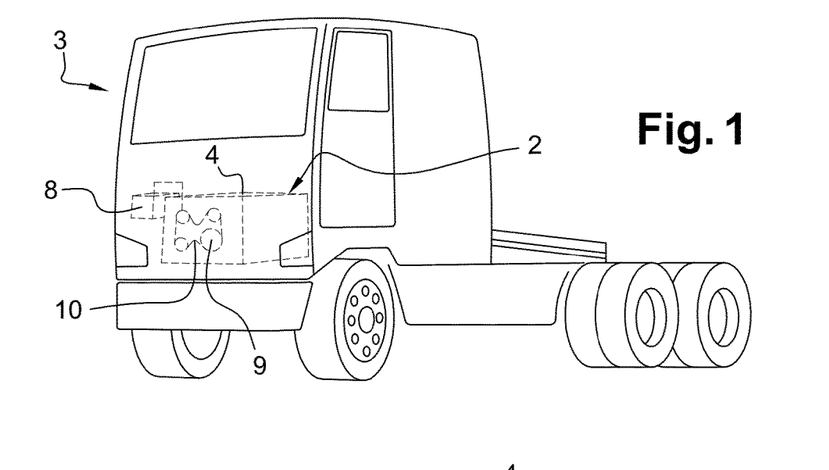
FIG. 1 is a perspective view of a vehicle comprising an engine arrangement according to an embodiment of the invention.

The invention relates to a drive system 1 for an engine arrangement 2 of a vehicle 3, an example of which is illustrated in FIG. 1.

In the illustrated embodiment, the vehicle 3 comprises a cab and can comprise a cargo body (not shown). The engine arrangement 2 may be located in front of the cab, below the seats. Although the vehicle illustrated in FIG. 1 is a truck, the invention is not restricted to this particular vehicle, but may also be used in other vehicles.

The engine arrangement 2 comprises an engine 4 having a crankshaft 5, an electric machine 6 that can be operated either in a motor mode or in generator mode, and at least one accessory 7. This accessory 7 can be for example a water pump, an air conditioner compressor, a cooling fan etc. In FIGS. 2a-b, 3a-b and 4a-b, the engine arrangement 2 comprises two accessories 7, 7'. The engine arrangement 2 further comprises a battery 8 connected to the electric machine 6, and an accessory pulley 9.

The electric machine 6, the accessory/accessories 7, 7' and the accessory pulley 9 are drivingly connected, typically through a belt 10 received by the accessory pulley 9 and pulleys 6a, 7a, 7'a connected respectively to the electric machine 6 and the accessory/accessories 7, 7'.

The drive system 1 of the engine arrangement 2 joins the accessory pulley 9 and the engine crankshaft 5. As a result, rotation can be transmitted from the electric machine 6 to the engine 4 and the accessory 7, and from the engine 4 to the electric machine 6 and the accessory 7, by means of the drive system 1, belt 10 and pulleys 9, 6a, 7a, 7'a. In particular, the accessory 7 is configured to be driven by one of the electric machine 6 and the engine 4.

The drive system 1 has a main axis 15 which can also be the axis of the engine crankshaft 5 and of the accessory pulley 9.

The drive system 1 comprises a gear reduction mechanism which, in the illustrated embodiment, is an epicyclical gear reduction mechanism 20. The epicyclical gear reduction mechanism 20 includes:

a first main gear 123,
a second main gear 121,
a first set of planet gears 23 meshing with the first main gear 123 and
a second set of planet gears 21 meshing with the second main gear 121.

The first set of planet gears 23 and the second set of planet gears 21 are supported by a planet carrier 25. Preferably, the first set of planet gears 23 and the second set of planet gears 21 are supported by only one planet carrier 25. Each gear of the first set of planet gears 23 is coupled to a gear of the second set of planet gears 21 such that no relative rotation between them is possible. Preferably, each gear of the first set of planet gears 23 is connected to a gear of the second set of planet gears 21 via the same pivot axis that is able to rotate about an axis 24 through a hole and a bearing of the planet carrier 25.

Preferably, the first set of planet gears 23 is arranged in the epicyclical gear reduction mechanism on one side of the planet carrier 25 and the second set of planet gears 21 is arranged on the other side of the planet carrier 25. The planet gears 23 of the first set of planet gears have outside diameters that are different from the outside diameters of the gears 21 of the second set of planet gears. The first main gear 123 and the second main gear 121 are arranged with respect to the first and second set of planet gears 23, 21 to rotate in the same direction about the main axis 15.

In the illustrated embodiment, the first main gear is a first annular gear 123 having its gear teeth oriented radially inwards and the second main gear is a second annular gear 121 having its gear teeth oriented radially inwards. The second main gear 121 has a pitch circle diameter that is different from the pitch circle diameter of the first main gear 123. In the illustrated embodiment the epicyclical gear reduction mechanism 20 is known as an epicyclical gear reduction of type III. In the illustrated embodiment the second main gear 121 has a greater pitch circle diameter than the first main gear 123.

In a non-represented variant, the first main gear can be a first sun gear having its gear teeth oriented radially outwards and the second main gear can be a second sun gear having its gear teeth oriented radially outwards. In this case the epicyclical gear reduction mechanism 20 is known as an epicyclical gear reduction of type IV.

The drive system 1 further comprises a free wheel 30 which is fixedly attached to a non-rotating part 16 of the engine arrangement in the mounted position. The non-rotating part can be an extension arm or bracket connected to the engine block and extending beside the accessory pulley 9. In the illustrated embodiment, the free wheel 30 comprises an outer cylinder 302 fixedly attached to non-rotating part 16, and an inner part 301. The inner part 301 can freely rotate about axis 15 with respect to the outer cylinder 302 in one direction, —which corresponds to a "free" state of the free wheel 30—while the inner part 301 cannot rotate about axis 15 with respect to the outer cylinder 31 in the opposite direction—which corresponds to an "engaged" state of the free wheel 30. Several embodiments can be envisaged for the free wheel 30.

In a mounted position, the first main gear 123 is connected to the engine crankshaft 5. The second main gear 121 is configured to be coupled to the free wheel 30 in a first operating phase of the drive system 1 corresponding to a starting phase of the engine 4. The planet carrier 25 is connected accessory pulley 9.

The drive system 1 preferably comprises an intermediate junction element that is preferably a slider 22 that can be moved in translation along the axis 15 between:

a first position (FIGS. 2a-c) in which it is coupled to the free wheel 30;
and a second position (FIGS. 3a-b) in which it is coupled to the accessory pulley 9. More specifically, in said second position, the slider 22 is coupled to the planet carrier 25.

To that end, coupling members such as dog teeth can be provided on the parts to be coupled. More specifically, the slider 22 can comprise first coupling members 26 for coupling with corresponding coupling members 26' arranged on the free wheel 30, and second coupling members 27 for coupling with corresponding coupling members 27' arranged on the accessory pulley 9.

The slider 22 is coupled to the second main gear 121 via a sliding connection 34, 34' that can be, for instance, realized by outside splines 34 of the slider 22 cooperating with inside splines 34 ' 34' of the second main gear 121.

In a variant coupling members 26, 26', 27, 27' can be formed by axial extensions of the outside splines 34 and inside splines 34'.

In a variant that is not represented, no intermediate piece is provided to couple the second main gear 121 with, for instance, the free wheel 30. In this variant, it is the second main gear 121 that is designed to axially move between the first position and the second position.

Besides, the slider 22 or the second main gear 121 can be moved to a third position (FIGS. 4a-b) that is an intermediate position between the first and second positions along the axis 15, in which the slider 22 is uncoupled from the free wheel 30 and from the accessory pulley 9.

Preferably, in each of said three positions, the slider 22 remains coupled with the second main gear 121 that is in turn meshed with the planet gears 21.

In order to move the slider 22, the engine arrangement 2 comprises an actuator 31. In the exemplary embodiment shown in FIG. 2c, the actuator 31 is an actuating cylinder comprising a piston 132 guided around a guiding rod 131. The piston 132 and the guiding rod 131 define between them a pressure chamber 134 that can be fed in fluid by a feeding pipe 133 formed in the rod 131 and fluidically connected to a control valve 33. The piston 132 is configured to push the slider 22 against the force of a spring 32 axially located between the first main gear 123 and the slider 22 (as represented on FIG. 2c), from the first position to the intermediate third position. Alternatively, the spring 32 could be located between the engine crankshaft 5 and the slider 22, as represented on FIG. 2b.

Furthermore, the piston 132 is configured to push the slider 22 against the force of the spring 32 and an additional spring 45 (FIG. 2c) from the intermediate third position to the second position. Having these two springs providing two subsequent steps allows a more stable third position. According to a variant not shown, the piston 132 and springs 32, 45 could be replaced by a double chamber piston, the neutral position of which is achieved by balance of pressures. This variant does not require springs.

The engine arrangement 2 further comprises at least one sensor (not represented) for detecting an operating condition of the engine 4, and a controller (not represented) connected to said sensor and capable of controlling the actuator 31 via the control valve 33. Depending on the detected engine operating condition, the actuator 31 is controlled to move the slider 22 to place it in one of its first, second and third positions.

Figure 2A:
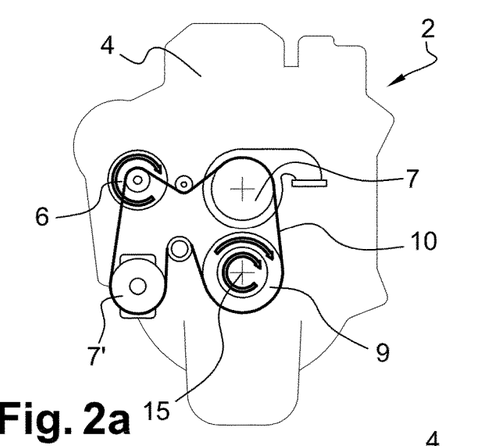
FIG. 2a is a schematic front view of the engine arrangement in a starting phase.
Figure 2B:
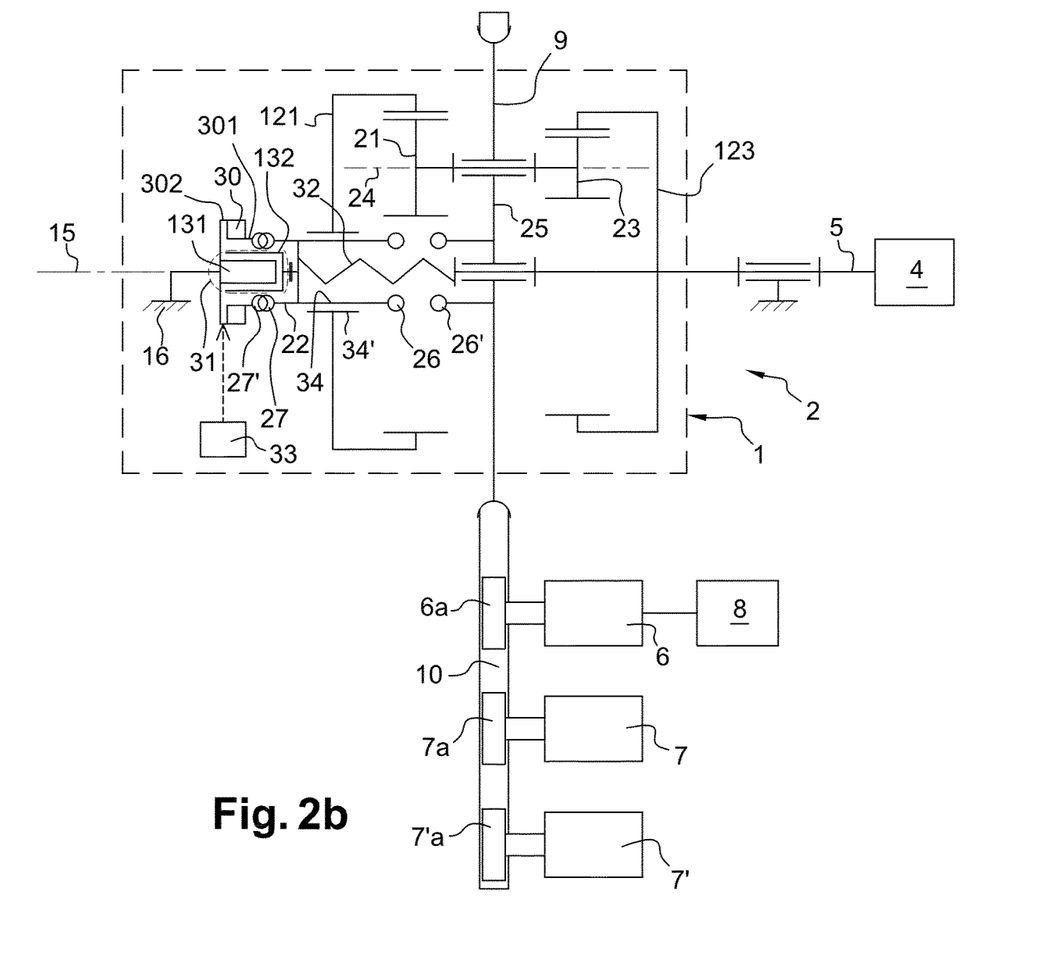
FIG. 2b is a drawing of the kinematic connections between the various components of the engine arrangement, in the starting phase.
Figure 2C:
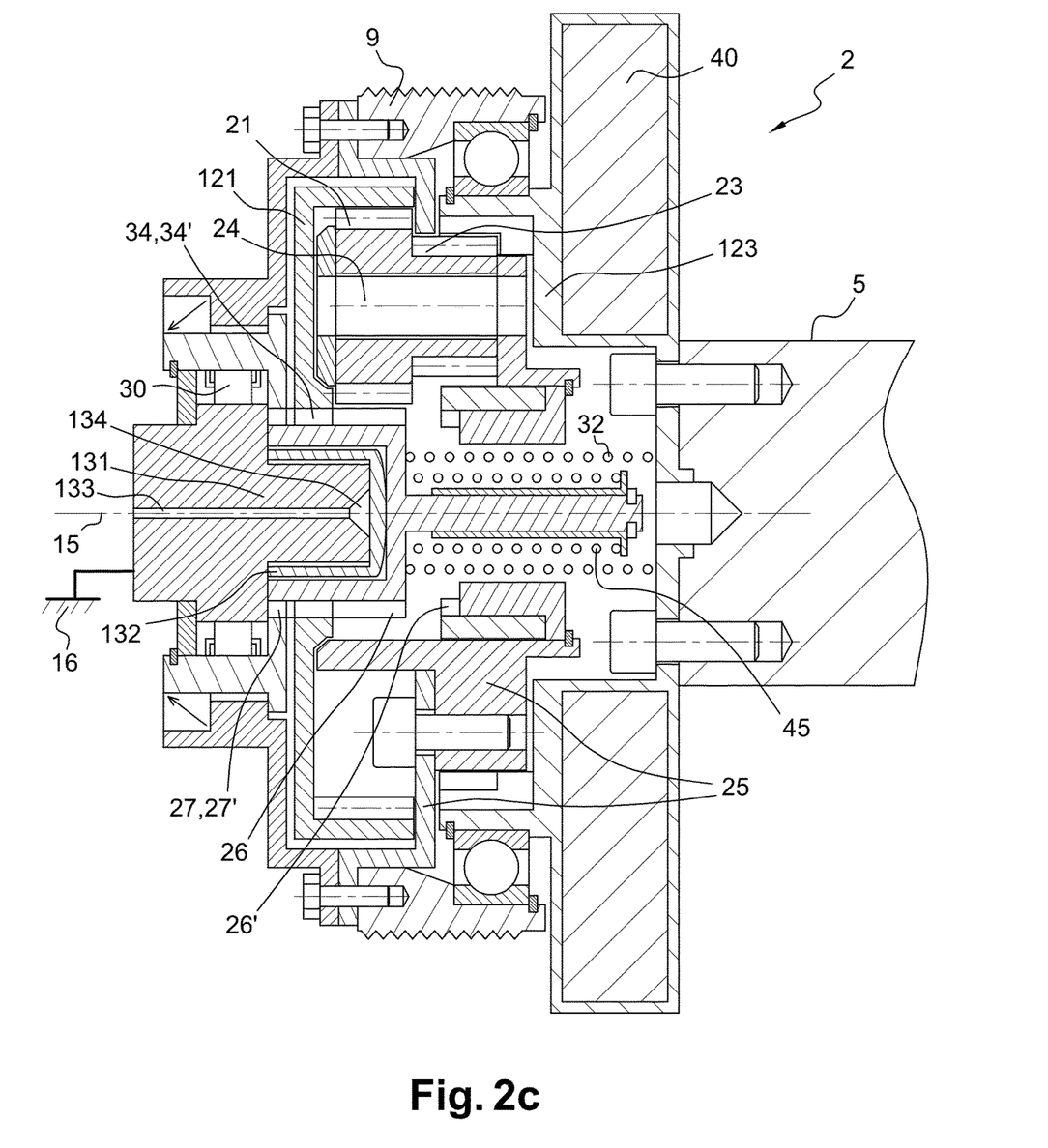
FIG. 2c is partial cross section of the engine arrangement, in the starting phase.

Reference is now made to FIGS. 2a-2c which show the engine arrangement 2 in a starting phase.

When the driver wants to start the vehicle 3, he/she generally turns a key or switches on an ignition switch. As a result, the battery 8 powers the electric machine 6 to start it.

In an embodiment, the first position, i.e. when the slider 22 and thus the second main gear 121 are coupled to the free wheel 30, is the default position. For example, the spring 32 can be used to maintain the slider 22 in the first position when the controller piloting the control valve 33 does not control the actuator 31 to place the slider 22 in another position. In a variant, the information "start the vehicle" is detected by the sensor and transmitted to the controller which controls the actuator 31 via the control valve 33 so that it places the slider 22 in the first position.

In this starting phase, the accessory 7 is driven by the electric machine 6. Moreover, the electric machine 6 drives the accessory pulley 9 which in turn rotates the planet carrier 25. As the second main gear 121 is coupled to the free wheel 30 via the slider 22 which is configured to be in the engaged state at the beginning of the starting phase, the slider 22 and the second main gear 121 do not turn about main axis 15, and each planet gear 21 rolling along the periphery of the second main gear 121 is thus driven in rotation about its own axis 24. Said periphery is an inside periphery when the first and second main gears 121, 123 are annular main gears. Because each planet gear of the first set of planet gears 23 is coupled to a planet gear of the second set of planet gears 21, each planet gear 21 is also driven in rotation about its own axis 24 at a rotating speed that is imposed by the planet gear 21. Then, the planet gears 23 transmit their rotating movement to the first main gear 123 and finally to the crankshaft 5.

In the starting phase, the gear reduction system—i.e. epicyclical gear reduction mechanism 20—links the rotation of the electric machine 6 with the rotation of the engine crankshaft 5, with a reduction ratio Ra=R0×R1a between the rotational speeds of the engine 4 and the electric machine 6. For example, Ra can be about 16 with R0 about 4 and R1a about 4. A reduction ratio R1a of about 4 can be obtained in the drive system 1 by adjusting the gears dimensions, that is to say by adjusting the pitch diameters and/or number of teeth of the gears. For instance, when the first and second main gears 123, 121 are annular main gears, and assuming that teeth have the same or approximately the same dimensions, the first annular main gear 123 can be designed with 57 teeth, the second annular main gear 121 can be designed with 63 teeth, each planet gear 23 of the first set of planet gears can be designed with 13 teeth and each planet gear 21 of the second set of planet gears can be designed with 19 teeth.

When combustion is established, engine 4 provides torque, and therefore crankshaft 5 accelerates sharply. As the direction of the torque transmitted to the second main gear 121 and to the slider 22 changes, this automatically leads to the free wheel 30 transiting to its free state.

When the free wheel 30 is in its free state, even if the slider 22 remains coupled to the free wheel 30, no torque or only an insignificant torque is transmitted from the engine 4 to the electric machine 6. This prevents severe stress in the belt 10 and other parts.

Figure 3A:
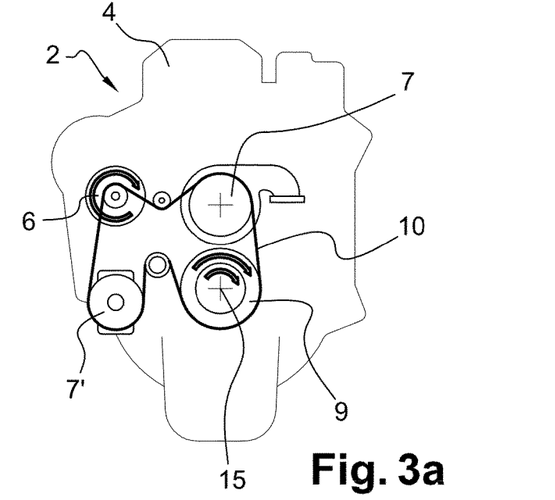
FIG. 3a, 3b are views similar to FIG. 2a, 2b, respectively, when the engine arrangement is in a running phase.
Figure 3B:
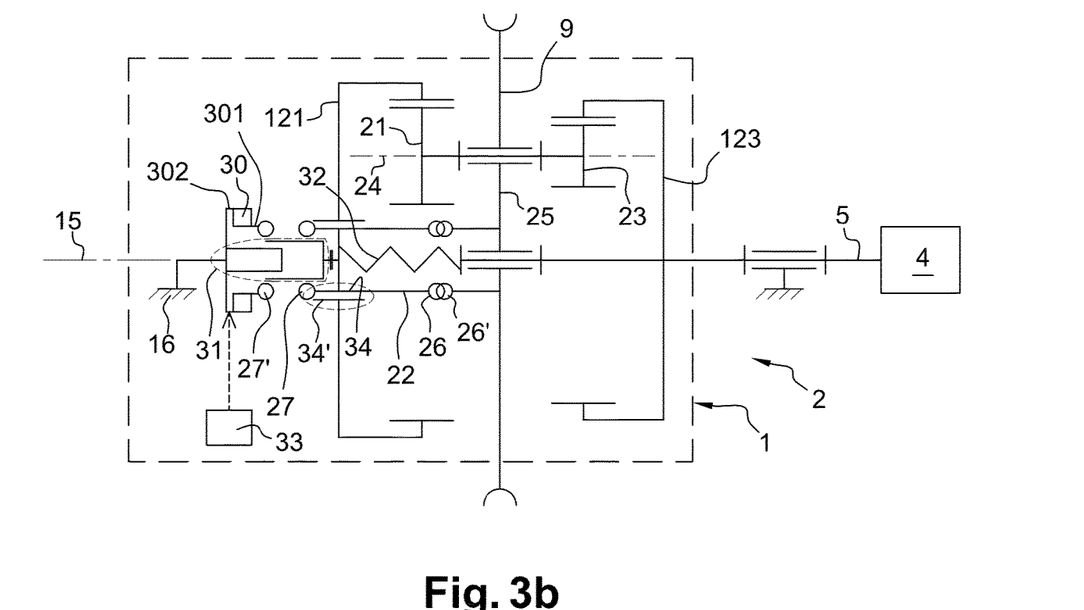

When the sensor detects that the engine 4 has been started, the controller controls the actuator 31 so that it places the slider 22 in the second position, i.e. coupled to the accessory pulley 9 via, for instance and as shown on the figures, the planet carrier 25. The engine arrangement 2 is then in a running phase, as shown in FIGS. 3a-3b. Some embodiments could require speed synchronization between the electric machine 6 and the engine 4 to ease meshing.

In this running phase (i.e. normal driving conditions), the engine 4 is running. The engine 4 is then capable of driving the accessory 7, and also the electric machine 6 so that said electric machine 6 can charge the battery 8. In the same way, the electric machine 6 can be put in motor mode, providing additional torque to accessory 7 and crankshaft 5 by consuming energy stored in battery 8.

More precisely, the crankshaft rotation leads to the rotation of the first main gear 123. Because the accessory pulley 9 and the planet carrier 25 are coupled to the slider 22, there is no relative motion between the planet carrier 25 and the second main gear 121. Therefore, the planet gears 21 cannot rotate about their own axes 24. Because each planet gear 21 is coupled to a planet gear 23, planet gears 23 cannot rotate about their own axes 24. Consequently, when the slider 22 is in the second position, a rotation of the first main gear 123 generates a rotation about the main axis 15 of the ensemble comprising the planet gears 21 and 23, first and second main gears 121 and 123, and the planet carrier 25 that is coupled to the accessory pulley 9.

In the running phase, the gear reduction system—i.e. the epicyclic gearing 20—links the rotation from the electric machine 6 toward the engine crankshaft 5, with a reduction ratio Rb=R0×R1b between the rotational speeds of the electric machine 6 and the engine 4. R1b=1, and thus Rb is different from Ra. For example, Rb can be in the range of 2 to 5, for example about 4.

From the running phase, the combustion engine 4 can be temporarily useless, for example if the vehicle is stopped in a traffic jam or at a traffic light. Then, in order to save fuel, the engine arrangement 2 automatically stops the engine 4, before it is restarted in response to a signal.

Figure 4A:
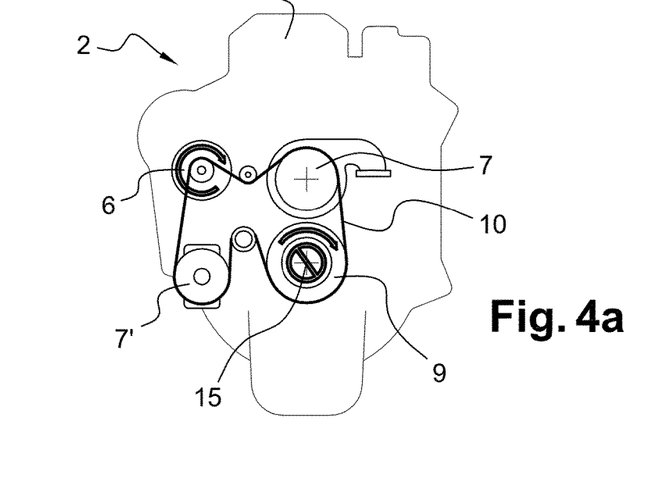
FIG. 4a, 4b are views similar to FIG. 2a, 2b, respectively, when the engine arrangement is in an electric phase.
Figure 4B:
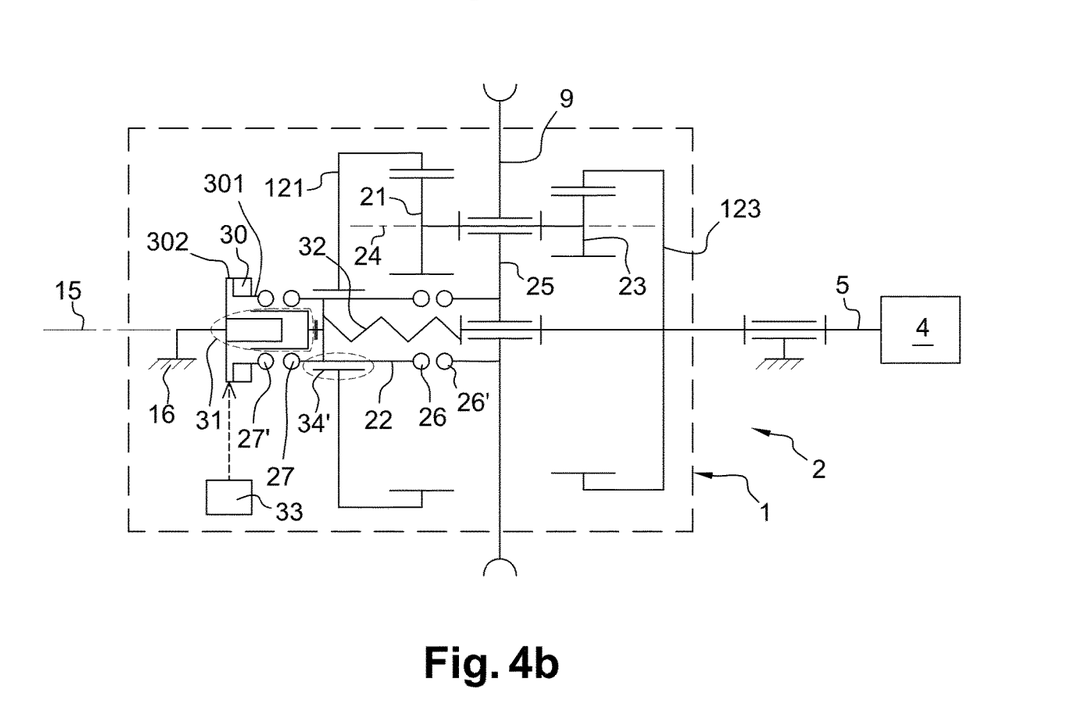

The sensor is configured to detect that the engine 4 has been stopped. The controller then controls via the control valve 33 the actuator 31 so that it places the slider 22 in the third position, i.e. uncoupled from the free wheel 30 and from the accessory pulley 9 and the planet carrier 25. The engine arrangement 2 is then in an electric phase (or "electrically driven accessory phase"), as shown in FIGS. 4a-4b.

Moreover, the controller stops the engine 4 and starts the electric machine 6.

Thus, the electric machine 6 drives the accessory 7 and rotates the accessory pulley 9, which in turn rotates the planet carrier 25 and planet gears 21. As the second main gear 121 is uncoupled from both the free wheel 30 and the accessory pulley 9, the rotation of the planet gears 23 results in the free rotation of the second main gear 121, that is to say without the application of a resistive torque on the second main gear 121. Planet gears 23 rotate about main axis 15 but are unable to transmit torque to the first main gear 123 or can only transmit a negligible torque to the first main gear 123. Crankshaft speed and pulley speed are considered as being un-correlated.

Thus, the electric machine 6 can be rotationally disconnected from the engine 4, and the accessory 7 can be driven even if the engine 4 is stopped.

In a same way, the electric phase can be selected while engine 4 is running to reduce fuel consumption by having a more efficient electric phase.

From the electric phase, the controller can calculate a need to be in another mode:

In order to restart the engine 4, the controller brings the slider 22 back to the first position, so that the electric machine 6 can restart the engine 4. This movement can be done passively in case a spring 32 is provided to define a default position as previously explained.

In order to switch from the electric phase to the running phase, the controller brings the slider 22 in the second position. Some embodiments could require speed synchronization between the electric machine 6 and the engine 4 to ease meshing.

Advantageously, the accessory pulley 9 is located along the axis of rotation 15 of the engine crankshaft 5 between the engine 4 and the free wheel 30.

Advantageously, the engine arrangement comprises an annular damper 40 that is located along the axis of rotation 15 of the engine crankshaft 5 between the accessory pulley 9 and the engine 4. The annular damper 40 is preferably attached between the engine crankshaft 5 and the first main gear 123, and more preferably the annular damper 40 is attached to first main gear 123. In some engine arrangement applications, the annular damper can be split into two parts comprising a viscous damper and a rubber damper.

It is to be understood that the present invention is not limited to the embodiments described above and illustrated in the drawings; rather, the skilled person will recognize that many changes and modifications may be made within the scope of the appended claims.

The invention claimed is:

1. A drive system for an engine arrangement, the drive system comprising an epicyclical gear reduction mechanism which has a main axis and which comprises: a first main gear arranged to rotate about the main axis, a second main gear arranged to rotate about the main axis in the same direction as the first main gear, a first set of planet gears with planet gears meshing with the first main gear, a second set of planet gears with planet gears meshing with the second main gear, a planet carrier, supporting both the first and second planet gears, the planet carrier being located, along the main axis, between the first main gear and the second main gear; wherein each planet gear of the first set of planet gears is coupled to a planet gear of the second set of planet gears such that no relative rotation is possible between them, wherein, in a mounted position: the first main gear is secured to an engine crankshaft, the planet carrier is secured to at least one accessory pulley which is drivingly connected to an electric machine and to at least one accessory; wherein the drive system further comprises a free wheel which is connected to a non-rotating part of the engine arrangement in the mounted position, wherein the second main gear is configured to be coupled, via an intermediate junction element of the drive system, to the free wheel in a first operating phase of the drive system, wherein, in the first operating phase, the free wheel is configured such that when the second main gear exerts torque on the free wheel in one direction, the free wheel is in an engaged state and stops the rotation of the second main gear, and when the second main gear exerts torque on the free wheel in the opposite direction, the free wheel is in a free state and allows rotation of the second main gear.

2. The drive system according to claim 1, characterized in that the planet carrier is located, along the main axis, between the first main gear and the free wheel.

3. The drive system according to claim 1, characterized in that the planet gears of the first set of planet gears have a pitch circle diameter that is different from the pitch circle diameter of the planet gears of the second set of planet gears, and in that the second main gear has a pitch circle diameter that is different from the pitch circle diameter of the first main gear.

4. The drive system according to claim 1, characterized in that the first main gear is a first annular gear having its gear teeth oriented radially inwards and the second main gear is a second annular gear having its gear teeth oriented radially inwards.

5. The drive system according to claim 1, characterized in that the first main gear is a first sun gear having its gear teeth oriented radially outwards and the second main gear is a second sun gear having its gear teeth oriented radially outwards.

6. The drive system according to claim 1, characterized in that the intermediate junction element, is moveable between a first position, in the first operating phase, in which the second main gear is coupled to the free wheel, and a second position, in a second operating phase, in which the second main gear is coupled to the accessory pulley in the mounted position, the second main gear is coupled to the planet carrier, in the second position.

7. The drive system according to claim 6, characterized in that the intermediate junction element, is moveable in translation along said main axis.

8. The drive system according to claim 6, characterized in that the intermediate junction element, comprises first coupling members for coupling with the free wheel, and second coupling members for coupling with the accessory pulley, for coupling with the planet carrier.

9. The drive system according to claim 6, characterized in that the intermediate junction element, is further configured to take a third position where it is uncoupled from the free wheel and from the accessory pulley, in a third operating phase.

10. The drive system according to claim 6, characterized in that the intermediate junction element is a slider able to slide in translation along said main axis.

11. The drive system according to claim 10, characterized in that the slider is coupled to the second main gear via a sliding connection without possibility of relative rotation between the slider and the second main gear.

12. An engine arrangement comprising an engine, an electric machine, at least one accessory, and an accessory pulley to which the electric machine and the accessory are drivingly connected, characterized in that it further comprises a drive system according to claim 1.

13. The engine arrangement according to claim 12, characterized in that it further comprises at least one sensor for detecting the operating condition of the engine, a controller connected to said sensor and capable of controlling an actuator configured to allow coupling or uncoupling the second main gear of the gear reduction mechanism and the free wheel.

14. The engine arrangement according to claim 13, characterized in that the actuator is configured to move the intermediate junction element, of the gear reduction mechanism to place it in one of its first, second and third positions, depending on the detected engine operating condition.

15. The engine arrangement according to claim 12, characterized in that the accessory pulley is located, along the axis of rotation of the engine crankshaft, between the engine and the free wheel.

16. The engine arrangement according to claim 15, characterized in that it further comprises an annular damper that is located, along the axis of rotation of the engine crankshaft, between the accessory pulley and the engine.

17. The engine arrangement according to claim 16, characterized in that the annular damper is attached between the engine crankshaft and the first main gear.

18. The engine arrangement according to claim 16, characterized in that the annular damper is attached to the first main gear.

19. A vehicle, characterized in that it comprises an engine arrangement according to claim 12.

* * * * *